United States Patent
Diachina et al.

(10) Patent No.: US 8,885,458 B2
(45) Date of Patent: Nov. 11, 2014

(54) SIMPLIFIED SIGNALING FOR SMALL DATA TRANSMISSIONS

(75) Inventors: John Walter Diachina, Garner, NC (US); Andreas Bergström, Vikingstad (SE); Paul Schliwa-Bertling, Ljungsbro (SE); Sudeep Manithara Vamanan, Nuremberg (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 147 days.

(21) Appl. No.: 13/544,325

(22) Filed: Jul. 9, 2012

(65) Prior Publication Data

US 2013/0016602 A1    Jan. 17, 2013

Related U.S. Application Data

(60) Provisional application No. 61/507,516, filed on Jul. 13, 2011.

(51) Int. Cl.
| | |
|---|---|
| *H04W 48/14* | (2009.01) |
| *H04L 1/00* | (2006.01) |
| *H04W 4/00* | (2009.01) |
| *H04W 4/20* | (2009.01) |
| *H04W 72/04* | (2009.01) |
| *H04W 74/08* | (2009.01) |

(52) U.S. Cl.
CPC ........... *H04W 72/048* (2013.01); *H04L 1/0009* (2013.01); *H04W 4/005* (2013.01); *H04W 4/20* (2013.01); *H04L 1/008* (2013.01); *H04L 1/0025* (2013.01); *H04W 74/0833* (2013.01); *H04W 72/0413* (2013.01)
USPC .......................................... 370/216; 370/329

(58) Field of Classification Search
CPC .. H04W 72/04; H04W 72/00; H04W 72/0046
USPC ........ 370/216, 331, 332; 455/561, 450, 452.2
See application file for complete search history.

(56) References Cited

U.S. PATENT DOCUMENTS

2008/0176588 A1*  7/2008  Ashdown et al. ............. 455/466
2011/0164561 A1*  7/2011  Song et al. .................... 370/328

FOREIGN PATENT DOCUMENTS

| EP | 2178237 A1 | 4/2010 |
| WO | WO 2007/078165 | * 7/2007 |
| WO | WO 2007/078165 A1 | 7/2007 |

OTHER PUBLICATIONS

Shao-Yu Lien et al: "Toward ubiquitous massive accesses in 3GPP machine-to-machine conmunications", IEEE Communications Magazine, IEEE Service Center, Piscataway, US, vol. 49, No. 4, Apr. 1, 2811, XP811372668.

(Continued)

*Primary Examiner* — Dang Ton
*Assistant Examiner* — Mewale Ambaye

(57) ABSTRACT

A signaling procedure for establishing and terminating connections for small data transmissions (SDTs) by wireless devices. A wireless device sends an access request message to a serving wireless access node on a random access channel (RACH). The access request message includes an indication that the access is for a SDT. The access request message includes the amount of data that will be transmitted as part of the SDT. The wireless access node sends an assignment message to immediately assign radio resources to the wireless device without further signaling needed for the SDT to begin. When the wireless device begins the SDT, the first data block is coded and transmitted according to a first predetermined coding scheme. If there are any subsequent data blocks, the wireless device includes an information element in the header of the first data block to indicate the coding scheme for the subsequent data blocks.

40 Claims, 10 Drawing Sheets

(56) References Cited

OTHER PUBLICATIONS

Rohde and Schwarz: "Receiver Measurements on GPRS and EGPRS Mobile Phones", Internet Citation, Dec. 31, 2882, XP882661834, Retrieved from the Internet: URL:http://www2.rohde-schwarz.com/file/n176_cmu288.pdf [retrieved on Oct. 10, 2011].

ZTE: "MTC simulation results with specific solutions", 3GPP Draft; R2-184662 MTC Simulation Results With Specific Solutions, 3rd Generation Partnership Project (3GPP), Mobile Competence Centre ; 658, Route Des Lucioles ; F-86921 Sophia-Antipolis Cedex; France, vol. RAN WG2, No. Madrid, Spain, Aug. 17, 2010, XP858685346, [retrieved on Aug. 17, 2010].

* cited by examiner

SIMPLIFIED SIGNALING FOR SMALL DATA TRANSMISSIONS

RELATED APPLICATION

This application claims the benefits under 35 U.S.C. §119(e) of U.S. Provisional Patent Application 61/507,516, filed 13 Jul. 2011, which is incorporated herein by reference.

TECHNICAL FIELD

The present invention relates generally to signaling protocols for wireless communication systems and, more particularly, to signaling protocols for small data transmissions by machine-type communication devices.

BACKGROUND

Machine-to-machine (M2M) communication, also referred to as machine-type communication (MTC), is the communication of data between machines with little or no human interaction. MTC devices, such as smart meters, are typically designed to send small amounts of data with varying periodicity. The data transmissions are typically delay tolerant and can in many cases be sent without acknowledgement at the radio link level. If an expected data transmission is not received, an MTC application can request a peer MTC application to transmit the missing data. It is expected that, in the near future, the number of MTC devices in use will far exceed the number of devices for human use.

The signaling protocols in use by most networks were designed primarily for human-generated traffic. Using the same signaling protocols for MTC devices can lead to inefficient radio resource utilization. The amount of signaling required to set-up or terminate a communication session is one area of concern. Because an MTC device will usually send only a small amount of data, the signaling overhead for a given amount of MTC traffic (i.e., user plane) will be higher than the signaling overhead for a similar amount of human-generated traffic.

Another area of concern is the potential for congestion and/or system overload. If a large number of MTC devices attempt to access the network simultaneously, the system may become congested, which could negatively impact the quality of service (QoS) experienced by higher priority human-generated traffic. Also, a substantially reduced volume of MTC devices will be able to successfully access the network during the period of congestion.

It would be beneficial to reduce the amount of signaling associated with SDTs so that the degree to which a network needs to restrict MTC devices from attempting network access (if the network is so capable) can be lessened during periods of congestion, and so that the number of SDTs that can be completed on a given packet channel resource during any given time interval can be increased (i.e., improved packet channel utilization can be realized).

Therefore, there is a need for signaling protocol enhancements that reduce signaling overhead for MTC devices and thereby minimize the impact of these devices on human-generated traffic and maximize the number of successful accesses experienced by MTC devices during periods of congestion.

SUMMARY

The present invention relates to simplified signaling protocols for wireless devices to establish and terminate connections for small data transmissions (SDTs). In one exemplary embodiment, a new random access procedure is defined for use by wireless devices that need to access the network for a SDT. In cases where the new SDT random access procedure is supported, the wireless device may send an access request message to the serving wireless access node on a random access channel (RACH). The access request message includes an indication that the access is for a SDT. The wireless device may also indicate the number or amount of radio resources required for the SDT. The wireless access node may send an assignment message to assign radio resources to the wireless device without further signaling needed for the SDT to begin. When the wireless device begins the SDT on the assigned radio resources, the first data block is coded and transmitted according to a predetermined coding scheme. If there are any subsequent data blocks, the wireless device includes an information element in the header of the first data block to indicate a second coding scheme for the subsequent data blocks. The subsequent data blocks are coded and transmitted according to the second coding scheme.

In some embodiments, a common uplink state flag (USF) may be assigned to multiple wireless devices. The wireless access node can implement a time-division multiplexing (TDM) scheme in the radio resource assignments for the wireless devices using a common USF to avoid collision between the wireless devices.

In some embodiments, an abbreviated contention resolution procedure can be used to resolve contention between competing wireless devices. The abbreviated form of contention resolution relies on the uniqueness of a random number included in the access request and the so-called capture effect. When a collision occurs, no attempt is made to resolve the conflict. Instead, the colliding wireless devices will both transmit in the assigned uplink radio blocks. Due to the capture effect, there is still a possibility that the wireless access node will receive the complete SDT for one of the colliding wireless devices.

In some embodiments, a new form of assignment message may be employed to address multiple wireless devices with a single assignment message. Because the assignment message for SDTs requires less information than is required for legacy operations, it is possible to include radio resource assignments for multiple wireless devices in a single assignment message by using a repeating structure for the information elements in the assignment message.

Exemplary embodiments comprise methods implemented by a wireless device for transmitting data in a wireless communication network. In one exemplary method, the wireless device transmits an access request message to a wireless access node in the wireless communication network. When the access is for a SDT, the wireless device includes in the access request message a first information element indicating that the wireless device is requesting radio resources for a SDT and a second information element identifying a number of radio resources (e.g., radio blocks) needed for the SDT. In response to the access request message, the wireless device receives a resource assignment message from the wireless access node which includes radio resources assigned to the wireless device for the SDT. The wireless device codes and transmits a first data block on a first assigned radio resource in accordance with a first predetermined coding scheme. The first data block includes an indication of a second coding scheme to be used for subsequent data blocks, if any. The wireless device codes and transmits the subsequent data blocks according to the second coding scheme indicated in the first data block.

Other exemplary embodiments comprise a wireless device configured for SDTs. The wireless device comprises a radio transceiver for communicating with a wireless access node and a processing circuit. The processing circuit is configured to implement a random access procedure for SDTs. More particularly, the processing circuit transmits an access request message to the wireless access node. When the access is for a SDT, the processing circuit includes in the access request message a first information element indicating that the wireless device is requesting radio resources for a SDT and a second information element identifying a number of radio resources (e.g., radio blocks) needed for the SDT. In response to the access request message, the processing circuit receives an assignment message from the wireless access node, which includes radio resources assigned to the wireless device for the SOT. The processing circuit codes and transmits a first data block on a first assigned radio resource in accordance with a first predetermined coding scheme. The first data block includes an indication of a second coding scheme to be used for subsequent data blocks, if any. The processing circuit codes and transmits the subsequent data blocks according to the second coding scheme indicated in the first data block.

Other exemplary embodiments comprise methods implemented by a wireless access node for receiving data from a wireless device. In one exemplary method, the wireless access node receives an access request message from the wireless device. When the access is for a SDT, the access request message includes a first information element indicating that the wireless device is requesting radio resources for a SDT and a second information element identifying a number of radio resources (e.g., radio blocks) needed for the unacknowledged transmission. In response to the access request message, the wireless access node sends an assignment message to the wireless device. The assignment message specifies the radio resources assigned to the wireless device for the SDT. The wireless access node receives on a first assigned radio resource a first data block associated with the SDT coded in accordance with a first predetermined coding scheme. The first data block includes an indication of a second coding scheme to be used for subsequent data blocks, if any. The wireless access node decodes the first data block according to the first predetermined coding scheme. The wireless access node receives subsequent data blocks on additional radio resources. The subsequent data blocks are coded according to the second coding scheme indicated in the first data block. The wireless access node decodes the subsequent data blocks according to the second coding scheme.

Other exemplary embodiments comprise a wireless access node configured to receive SDTs from a wireless device. The wireless access node comprises a radio transceiver for communicating with the wireless device and a processing circuit. The processing circuit is configured to implement a random access procedure for SDTs. The processing circuit receives an access request message from the wireless device. When the access is for a SDT, the access request message includes a first information element indicating that the wireless device is requesting radio resources for a SDT and a second information element identifying a number of radio resources (e.g., radio blocks) needed for the unacknowledged transmission. In response to the access request message, the processing circuit sends an assignment message to the wireless device. The assignment message specifies radio resources assigned to the wireless device for the SDT. The processing circuit receives a first data block associated with the SDT on a first assigned radio resource. The first data block is coded in accordance with a first predetermined coding scheme and includes an indication of a second coding scheme to be used for subsequent data blocks, if any. The processing circuit receives the subsequent data blocks coded according to the second coding scheme. The processing circuit decodes the first data block according to the first predetermined coding scheme and decodes the subsequent data block(s) according to the second coding scheme.

With the signaling techniques described in further detail below, network operators are provided with the ability to handle a large number of wireless devices with lower signaling overhead. Of course, those skilled in the art will appreciate that the methods and apparatuses described herein are not limited to the above features, advantages, contexts, or examples, and will recognize additional features and advantages upon reading the following detailed description and viewing the accompanying drawings.

DETAILED DESCRIPTION

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

The term "wireless device" is used herein to refer generally to an end terminal that attaches to a wireless communication network, and may refer to either an MTC device or a non-MTC device. Thus, the term is generally intended to be synonymous with the term "User Equipment," or UE, as that term is used by the $3^{rd}$-Generation Partnership Project (3GPP), and includes standalone wireless devices, such as terminals, cell phones, smart phones, and wireless-equipped personal digital assistants, as well as wireless cards or modules that are designed for attachment to or insertion into another electronic device, such as a personal computer, electrical meter, etc.

Likewise, unless the context clearly indicates otherwise, the term "wireless access node" is used herein in its most general sense to refer to a base station or wireless access point in a wireless communication network, and may refer to wireless access nodes that are controlled by a physically distinct radio network controller as well as to more autonomous access points, such as the so-called evolved Node Bs (eNodeBs) in Long-Term Evolution (LTE) networks.

Figure 1:
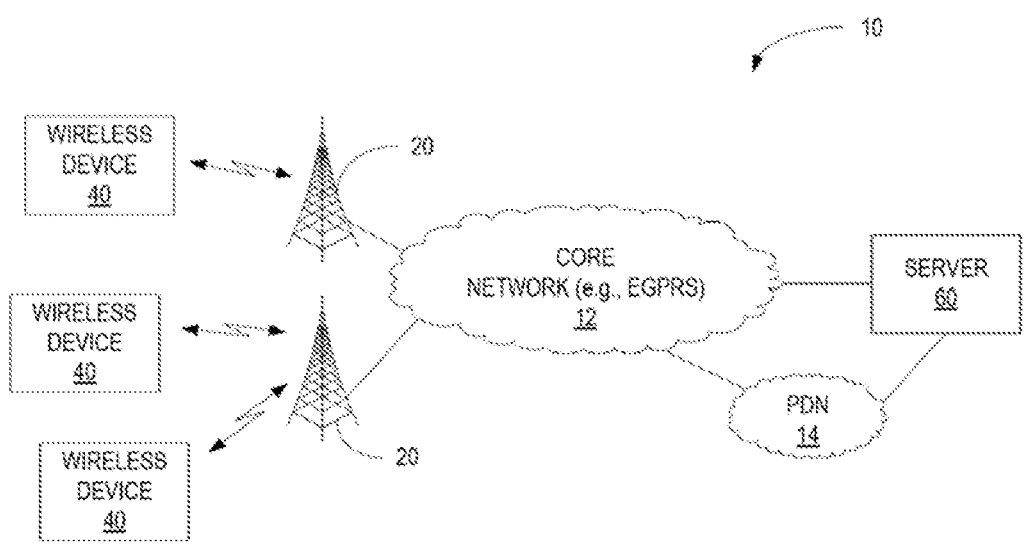
FIG. 1 illustrates an exemplary communication network for communication by MTC devices.

Referring now to the drawings, FIG. 1 illustrates an exemplary wireless communication network 10 including a core network 12, a plurality of wireless access nodes 20, and a plurality of wireless devices 40. The communication network 10 may operate according to any standard that employs a contention-based random access channel (RACH). For illustrative purposes, an exemplary embodiment will be described in the context of a Global System for Mobile Communications (GSM) network 10 implementing the Enhanced General Packet Radio Service (EGPRS). A GSM/EGPRS network is also known as an EDGE (Enhanced Data Rate for GSM) network. Those skilled in the art will appreciate, however, that the present invention is more generally applicable to other wireless communication systems, including Wideband Code Division Multiple Access (WCDMA), Long-Term Evolution (LTE), and Worldwide Interoperability for Microwave Access (WiMAX) systems.

The wireless communication network 10 includes a plurality of wireless access nodes 20 that provide network access to wireless devices 40. Wireless communication network 10 connects to an external packet data network (PDN) 14, such as the Internet. The wireless devices 40 may communicate with one or more servers 60, e.g., MTC servers, connected to the core network 12 or packet data network 14.

The wireless devices 40 may comprise MTC devices for collecting and reporting of data over a communication network, or non-MTC devices. MTC has been defined as using a specific type of wireless communication network traffic. See, e.g., 3GPP Technical Report 23.888, "System Improvements for Machine-Type Communications," the disclosure of which is incorporated herein by reference in its entirety. One example of an MTC device is a gas or power meter with a wireless transceiver for reporting usage of gas or electrical power to the server 60 at predetermined time periods. Non-MTC devices are devices, such as a cell phone, smart phone, laptop computer, etc., used for voice and data communications by human users. An MTC device may comprise a dedicated device used specifically for data collection and reporting. In other embodiments, a wireless device 40 may function part of the time as an MTC device and part of the time as a non-MTC device.

It is expected that many MTC devices will be used primarily for SDTs, e.g., 40 octets or less of data, and that these MTC devices will be configured for low priority access. Thus, the following service attributes can be assumed for these devices:

only a small number of radio blocks will be required to complete the SDT;
the SDT is tolerant of delays;
successful transmission is not guaranteed; and
a default set of QoS (Quality of Service) requirements can be used.

Based on these service attributes, a simplified signaling procedure can be used to set-up and terminate connections for SDTs. The simplified signaling procedures can significantly reduce control plane signaling for SDTs by MTC devices. The simplified signaling procedures not only reduce the number and size of signaling messages required to establish and terminate connections, but also potentially eliminate some legacy procedures. For example, the Create BSS (Base Station Subsystem) PFC (Packet Flow Context) procedure between the wireless access node 20 and Serving GSM Support Node (SGSN) can be eliminated when the wireless access node 20 detects an access attempt for a SDT by a low priority MTC device since in this case it can assume a default set of QoS requirements are applicable. Also, the PDP (Packet Data Protocol) Context Activation procedure between the MTC device and SGSN can be eliminated in situations where the SGSN has knowledge of the IP address assigned to the MTC device by the Gateway GSM Support Node (GGSN). This knowledge can potentially be conveyed to an MTC device using signaling (other than that associated with PDP Context Activation) for the case where SDTs include the UDP/IP or TCP/IP layers in the protocol stack.

In exemplary embodiments, a new SDT random access procedure is used to establish a connection with the network 10 when a wireless device 40 needs to gain access for a SDT. From the perspective of the wireless device this new SDT random access procedure is started when the wireless device transmits a packet channel request message and is completed when the wireless device receives a matching packet uplink assignment message. Although intended for use primarily by MTC devices, these procedures can be used as well by non-MTC devices.

To briefly summarize, a wireless access node 20 broadcasts its capability to support the SDT random access procedure with system information on the broadcast control channel (BCCH). The system information may also include a size threshold to be used by a wireless device 40 to determine whether a given transmission qualifies as a SDT for purposes of the SDT random access procedure. These indications may be transmitted using a new information element in a system information (SI) message, such as the SI21 message, or any other message that has an appropriate amount of room.

When the wireless device 40 needs to gain access for a SDT, it sends a packet channel request message on the random access channel (RACH) to the wireless access node 20. The packet channel request message includes an indication that the purpose of the access is for a SDT. The packet channel request message may also include the number of radio link control (RLC) data blocks that will be required for the SDT.

Upon receipt of the packet channel request message, the wireless access node 20 assigns radio resources to the wireless device 40 for the SDT and sends an assignment message to the wireless device 40. The assignment message includes an indication of the radio resources assigned to the wireless device for the SDT. In one exemplary embodiment for EDGE networks, the wireless access node 20 assigns one or more uplink radio blocks to the wireless device 40. Each uplink radio block contains exactly one RLC data block. Thus, the number of uplink radio blocks assigned equals the number of RLC data blocks in the SDT.

When the wireless device 40 begins its transmission, the first RLC data block in the SDT is transmitted according to a predetermined coding scheme, which may be a default coding scheme specified in the system information. Because a packet flow identifier (PFI) is not required for the SDT (i.e., since PDP Context Activation is not used), the PFI information element can be used to indicate the coding scheme for the remaining RLC data blocks in the SDT. In some embodiments, the assignment message sent by the wireless access node 20 to the wireless device 40 may specify a proposed coding scheme to use for the RLC data blocks after the first RLC data block. In this case, the PFI information element can be parsed into two fields. The first field indicates whether the wireless device 40 will use the recommended coding scheme for the additional RLC data blocks and, if not, the coding scheme that will be used. The second field indicates a number of additional RLC data blocks needed for the SDT.

Figure 2:
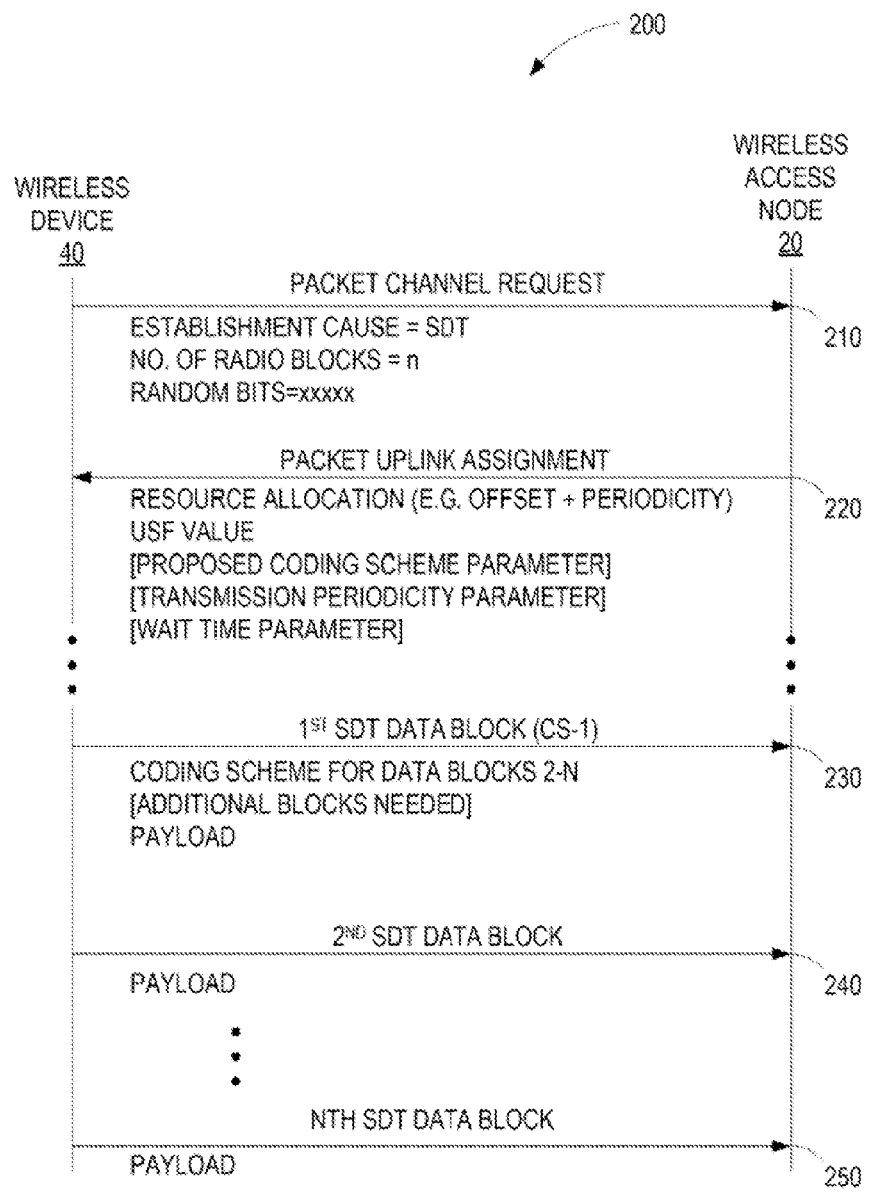
FIG. 2 illustrates an exemplary random access and data transmission procedure for SDTs.

FIG. 2 shows a signaling flow diagram for one exemplary embodiment of a SDT random access and data transmission procedure 200. It is assumed that the wireless device 40 has read the system information and that the wireless access node 20 supports the SDT random access and data transmission procedure 200. When the wireless device 40 needs to access the network 10 for a SDT, it sends a packet channel request message to the wireless access node 20 (210). The packet channel request message includes a SDT specific establishment cause information element set to a value indicating that the access is for a SDT.

Table 1 below illustrates message content for an exemplary packet channel request message. As shown in Table 1, the establishment cause information element is set to a value of "1110" to indicate a one phase access for a SDT. In addition, the packet channel request message includes a 2-bit Radio Block Count information element identifying a number of radio blocks required for the SDT. The packet channel request message further includes a RandomBits information element used for contention resolution.

TABLE 1

EGPRS PACKET CHANNEL REQUEST message content

| Establishment Cause | Value | Required Fields |
| --- | --- | --- |
| One Phase Access Request | 0 | MultislotClass (5 bits) Priority (2 bits) RandomBits (3 bits) |
| Short Access Request - The value 100 was allocated in an earlier version of the protocol and shall not be used by the mobile station | 100 | NumberOfBlocks (3 bits) Priority (2 bits) RandomBits (3 bits) |
| One Phase Access Request By Reduced Latency Mobile Station | 101 | MultislotClassGroup (5 bits) Priority (2 bits) RandomBits (3 bits) |
| Two Phase Access Request | 110000 | Priority (2 bits) RandomBits (3 bits) |
| Signaling | 110011 | RandomBits (5 bits) |
| One Phase Access Request in RLC Unacknowledged Mode | 110101 | RandomBits (5 bits) |
| Dedicated Channel Request | 110110 | RandomBits (5 bits) |
| Emergency Call | 110111 | RandomBits (5 bits) |
| One Phase Access - SDT | 1110 | Radio Block Count (2 bits) RandomBits (5 bits) |

Upon receipt of the packet channel request message, the wireless access node 20 transmits a packet uplink assignment message (220). The packet uplink assignment message (220) includes the random bits transmitted to the wireless access node 20 by the wireless device 40, the radio resources assigned to the temporary block flow (TBF) associated with the SDT, and an uplink state flag (USF). The random bits indicate to the wireless device 40 that the assignment message is responsive to the received packet channel request message (i.e., the wireless device 40 uses the random bits to determine if a matching assignment message has been received). The assignment message may also include relative reserved block position (RRBP) information element to indicate the point at which the wireless device 40 can start transmitting using the radio resources assigned for the SDT. As will be hereinafter described in greater detail, a common USF may be assigned to multiple wireless devices 40.

In some embodiments, the packet uplink assignment message (220) may further include a coding scheme parameter, a transmission periodicity parameter, and a wait time parameter. The coding scheme parameter may be used by the wireless access node 20 to indicate a proposed coding scheme for the additional RLC data blocks, if any, after the first RLC data block in the SDT. The wireless device 40 may optionally select the coding scheme recommended by the wireless access node 20, or select another coding scheme. The transmission periodicity parameter may be used by the wireless access node 20 to indicate the spacing of the radio resources assigned to the wireless device 40 starting with the first radio resource indicated by the RRBP. The transmission periodicity parameter can be used by the wireless access node 20 to time-multiplex SDTs from multiple MTC devices using a common USF. Finally, the assignment message may include a wait time parameter to be used by the wireless device 40 in the event that the SDT is aborted. When a SDT is aborted, the wireless device 40 sets a timer to a timer value in the range specified by the wait time parameter. The wireless device 40 is prevented from attempting a random access until the timer expires.

After receiving the assignment message from the wireless access node 20 having random bits that match those transmitted in the packet channel request message, the wireless device 40 begins the SDT using the radio resources specified in the assignment message (230, 240, 250). The assigned radio resources may be indicated by an offset parameter, e.g., RRBP, indicating the resources for the first RLC data block and a transmission periodicity parameter indicating the resources for each additional RLC data block, if any. The offset parameter may be an integer value indicating the location of the first uplink radio block relative to the downlink radio block in which the assignment message was received. The transmission periodicity parameter indicates the radio resource spacing between successive uplink radio blocks in the SDT. For example, if the initial radio block is designated as N and the transmission periodicity parameter is 4, the SDT will occur in radio blocks N, N+4, . . . until all RLC data blocks have been transmitted.

In exemplary embodiments, the first RLC data radio block in a SDT may be transmitted according to a default coding scheme, such as the CS-1 coding scheme (230). Under the current standards, each RLC data block includes a 7-bit PFI information element. In the case of SDTs as herein described, the PFI information element is not required. Instead, the PFI bits can be parsed into two new information elements. Those information elements include a 2-bit Optimized System Access Coding (OSAC) information element and a 2-bit Additional Radio Blocks (ARB) information element. The value of the OSAC information element indicates the channel coding the wireless device 40 will use for any additional RLC data blocks in the SDT.

If SDTs are infrequent, the wireless device 40 may have more relevant information regarding channel conditions than the wireless access node 20. For example, the wireless devices 40 can perform channel quality measurements in one or more downlink slots prior to sending the access request message. Based on the channel quality measurements, the wireless device 40 can determine the coding scheme and number of RLC data blocks required for the SDT. Table 2 below indicates the possible values and respective meanings of the OSAC information element in one exemplary embodiment.

TABLE 2

OSAC Information Element

| OSAC | Description |
|---|---|
| 00 | The coding scheme indicated in the assignment message (e.g., Packet Uplink Assignment or Immediate Assignment message) is used for all remaining radio blocks. |
| 01 | CS-1 coding will be used for all remaining radio blocks (22 octets per RLC data block). |
| 10 | CS-2 coding will be used for all remaining radio blocks (32⅞ octets per RLC data block). |
| 11 | CS-3 coding will be used for all remaining radio blocks (38⅜ octets per RLC data block). |

As previously noted, the wireless access node 20 may indicate a recommended coding scheme in the assignment message. If the wireless device 40 elects to use the coding scheme recommended by the wireless access node 20, it sets the value of the OSAC to "00." If not, the wireless device 40 may select an alternative coding scheme and set the OSAC field to the corresponding value.

If the wireless device 40 accepts the coding scheme recommended by the wireless access node 20, the number of radio blocks required to complete the SDT may change from the initial estimate made when the wireless device 40 sent the access request message. In this case, the wireless device 40 may use the ARB field to indicate the number of additional radio blocks that will be required to complete the SDT. The ARB information element may comprise the two bits immediately following the OSAC information element whenever the OSAC is set to 00. Otherwise, the ARB information element may be omitted. Table 3 below shows one set of possible values for the ARB field and corresponding interpretations, in one exemplary embodiment.

TABLE 3

ARB Information Element

| ARB | Description |
|---|---|
| 00 | No additional radio blocks are needed. |
| 01 | One additional radio block is needed. |
| 10 | Two additional radio blocks are needed. |
| 11 | Three additional radio blocks are needed. |

Because the wireless access node 20 knows which uplink radio blocks are assigned to which wireless devices 40, the PFI information element can also be omitted from the additional RLC data blocks in the SDT after the first RLC block. The additional bits saved by eliminating the PFI information element can be used to increase the payload of the additional RLC data blocks. Alternatively, the PFI bits can be used for further radio resource optimization or other purposes.

In some embodiments, a common USF may be assigned to multiple wireless devices 40. The wireless access node 20 can use the offset parameter and transmission periodicity parameter to time-multiplex the SDTs from the wireless devices 40 with a common USF. Table 4 below illustrates the initial uplink radio block and transmission periodicity parameter of four wireless devices 40 sharing a common USF, in one exemplary embodiment.

TABLE 4

| Device | Initial. RB | Periodicity Para. |
|---|---|---|
| 1 | N | 4 |
| 2 | N + 1 | 4 |
| 3 | N + 2 | 4 |
| 4 | N + 3 | 4 |

As shown in Table 4, the wireless devices 40 sharing the common USF use the offset parameter to begin their respective transmissions in different uplink radio blocks. The transmission periodicity parameter is set to the same value for each wireless device 40. Thus, the uplink radio blocks assigned for the additional SDT data blocks for different wireless devices 40 will also be staggered in time.

In one exemplary embodiment, the common USF is used to determine whether an assigned uplink radio block may be used by the wireless device 40 for the SDT. As previously noted, the wireless device 40 is assigned a USF in the assignment message transmitted in response to the packet channel request message. The wireless device 40 may be configured to transmit an RLC data block only when the USF flag is set to the value specified in the assignment message even though, according to its offset and transmission periodicity parameters, it already anticipates a certain sequence of uplink radio resources to be assigned to it. Therefore, before transmitting the RLC data block, the wireless device 40 checks whether the USF in a corresponding downlink radio block is set to the value specified in the assignment message. If so, the wireless device 40 is allowed to transmit the RLC data block in the assigned uplink radio block. If the USF is set to a different value, the wireless device 40 must abort the SDT.

The wireless access node 20 can use the USF to abort a scheduled SDT. For example, the wireless access node 20 may decide to abort a SDT to make resources available for a higher priority transmission. As another example, the wireless access node 20 may decide to abort a scheduled SDT when it fails to receive an RLC data block in one of the scheduled uplink radio blocks. For example, assume that a wireless device 40 is assigned four uplink radio blocks for a SDT based on its assigned offset and transmission periodicity parameters. Further assume that the wireless access node 20 receives RLC data blocks in the first two uplink radio blocks, but fails to receive an RLC data block in the third uplink radio block. In this case, the wireless access node 20 can change the USF associated with the fourth scheduled uplink radio block. The wireless device 40 will check the state of the USF before transmitting the final (i.e. the fourth) RLC data block and will abort the transmission of the final RLC data block.

When a SDT is aborted, the wireless access node 20 may release the temporary flow identify (TFI) associated with the aborted SDT when it transmits a USF that does not match the USF for the scheduled transmission. Upon transmitting the USF, the wireless access node 20 knows that the wireless device 40 will abort the SDT so that the TFI will be available for reuse. In cases where the wireless access node 20 has received all of the RLC data blocks for a SDT, the TFI may be released without any delay.

In the case where the wireless device 40 aborts the SDT, it may be configured to start a wait timer. The period of the wait timer may be any randomly selected value in the range specified by the wait timer parameter transmitted in the assignment message. Once the wait timer has expired, the wireless device 40 may attempt a random access to establish a connection for sending the same or a new user plane payload (i.e., the user plane payload associated with an aborted SDT may be resent when the wireless device establishes a connection for another SDT, or it may be discarded).

In some embodiments, a new assignment message may be defined to address multiple wireless devices 40 attempting a SDT with a single assignment message. The amount of information required to be conveyed in the assignment message for a SDT is less than for legacy operations. Thus, it may be possible to address two or more wireless devices 40 with a single assignment message by using a repeating structure where each instance provides the information elements required by an addressed wireless device. Addressing multiple wireless devices 40 in an assignment message will reduce the number of signaling messages transmitted on the Access Grant Channel (AGCH), and therefore will increase the capacity of the AGCH.

In some exemplary embodiments, an abbreviated form of contention resolution is used for access attempts associated with a SDT. The abbreviated form of contention resolution relies on the uniqueness of the random number included in the access request and the so-called capture effect. As previously noted, the access request message transmitted by wireless device 40 includes a five-bit random number. A collision occurs when two wireless devices 40 selecting the same random number transmit at the same time on the RACH. Such collisions are likely to occur infrequently.

In the unlikely event of a collision, the wireless access node 20 relies on the capture effect to resolve the contention. The capture effect is the tendency of the wireless access node 20 to capture transmissions from the same wireless device 40 even though multiple wireless devices 40 are transmitting using the same uplink radio blocks. When a collision occurs, no attempt is made to resolve the conflict. Instead, the colliding wireless devices 40 will both transmit in the assigned uplink radio blocks. Due to the capture effect, there is still a possibility that the wireless access node 20 will receive the complete SDT for one of the colliding wireless devices 40. In this case, the SDT for one of the wireless devices 40 will not be received by the wireless access node 20 without that wireless device realizing a SDT failure has occurred. In the worst case scenario, the SDT for each of the colliding wireless devices 40 will fail in that the wireless access node 20 receives one or more data blocks from each of the colliding wireless terminals (i.e. the capture effect is not realized). When a SDT fails, the MTC application on the network side can potentially detect missing transmissions and trigger a retransmission of the missing user plane payload if necessary.

According to legacy procedures, the wireless access node 20 echoes the entire eleven-bit access request message within the assignment message (e.g., the Immediate Assignment message). Because a new access request message is defined for the SDT random access procedure (e.g., a Packet Channel Request message with a currently unused code point or training sequence code), contention between a wireless device 40 attempting access for a SDT and another device using legacy access procedures is avoided. If the wireless access node 20 does not receive a SDT access request message, it uses legacy procedures for the connection establishment. Any SDT access request that collides with a legacy type access request when the wireless access node 20 receives the legacy access request will be aborted by the wireless device 40 that sent the SDT access request because the information included in the assignment message will not reflect the information corresponding to the SDT access request. Conversely, if the wireless access node 20 receives the SDT access request for this collision case, the wireless access node 20 will use the new SDT procedures for connection establishment and the wireless device 40 that used the legacy access request will abort its access attempt because the information included in the assignment message will not reflect the information corresponding to the legacy access request. Consequently, contention between SDTs and non-SDT can be successfully resolved.

Figure 3:
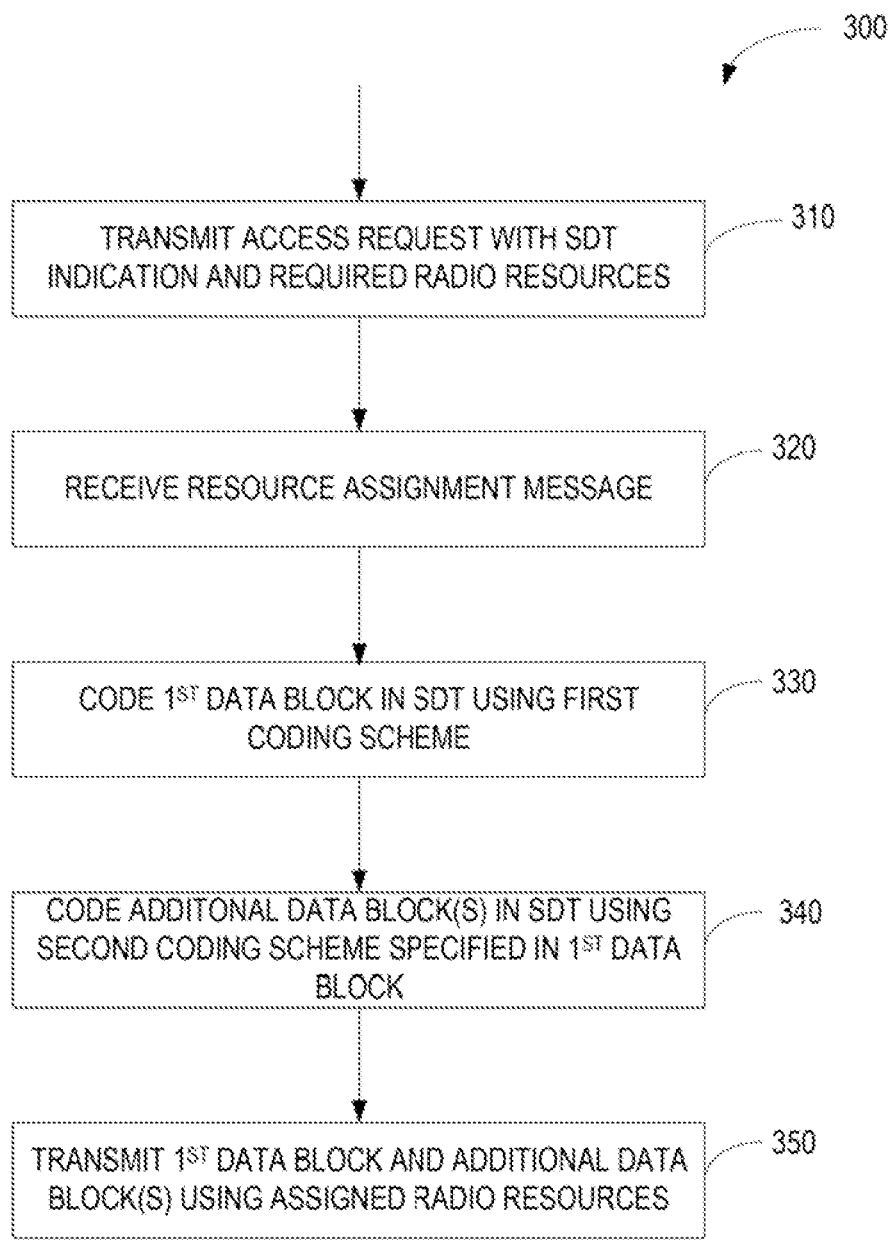
FIG. 3 illustrates a method implemented by a wireless device for SDTs.

FIG. 3 illustrates an exemplary procedure 300 implemented in a wireless device 40 for SDTs. When the wireless device 40 needs to access the network 10 for a SDT, it transmits an access request message, e.g., Packet Channel Request message, to the wireless access node 20 (block 310). The access request message includes a first information element indicating that access is needed for a SDT and the number of radio blocks needed for the SDT. In response to the access request message, the wireless device 40 receives an assignment message (e.g., Packet Uplink Assignment or Immediate Assignment message) allocating radio resources (e.g., uplink radio blocks) for the SDT (block 320). In response to the assignment message, the wireless device 40 codes a first data block in the SDT according to a first predetermined coding scheme (block 330). The first data block includes an indication of a second coding scheme used for additional data blocks, if any. When additional data blocks are transmitted, the wireless device 40 codes the additional data blocks according to the second coding scheme specified in the first data block (block 340). The first data block and additional data block(s) are transmitted to the wireless access node 20 using the assigned radio resources (block 350).

Figure 4:
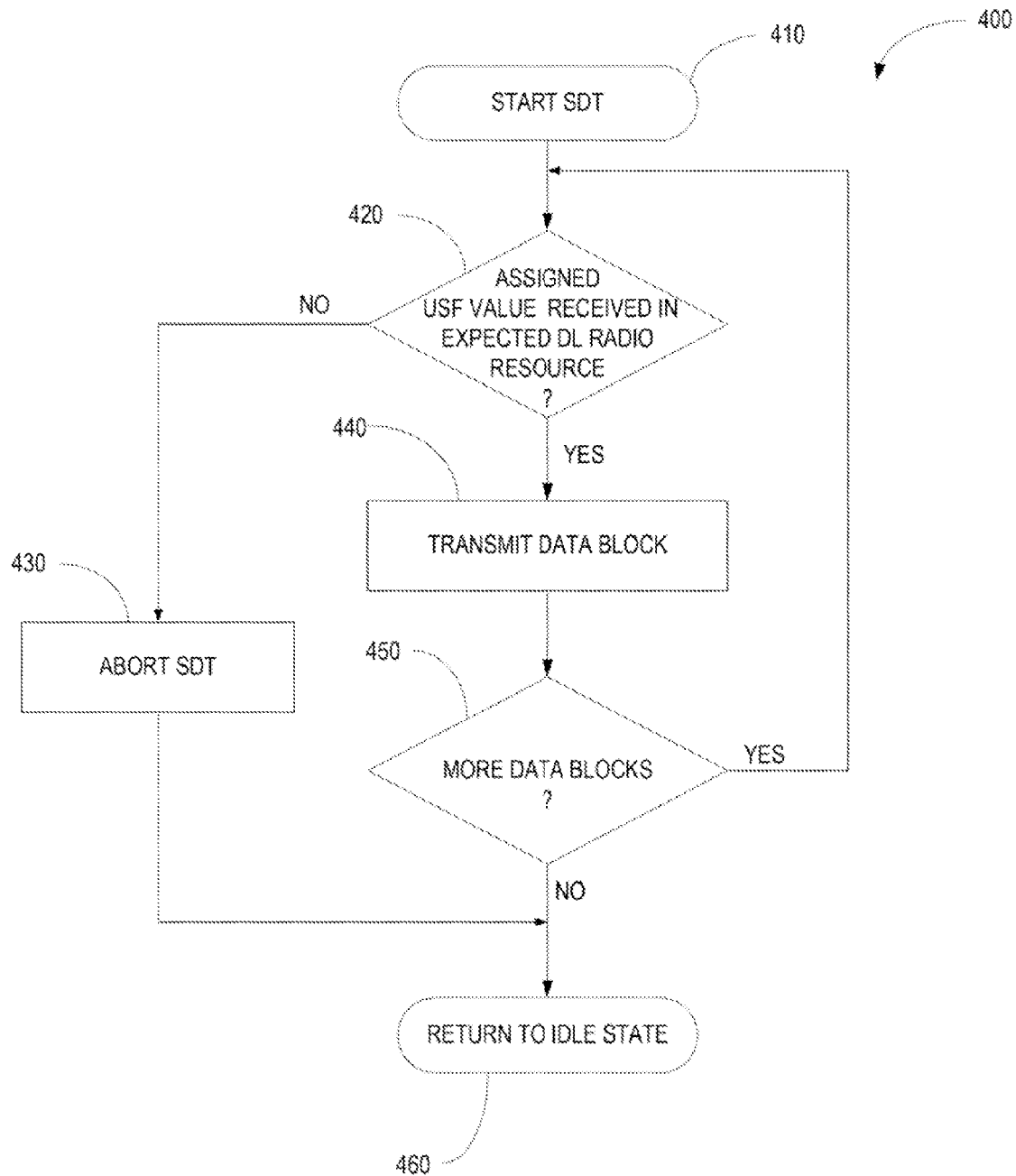
FIG. 4 illustrates a method implemented by a wireless device of transmitting data blocks during a SDT.

In some embodiments, the wireless device 40 can be configured to abort or terminate a SDT before it has finished transmitting all of the data blocks in the SDT. FIG. 4 illustrates an exemplary procedure 400 implemented by a wireless device 40 for transmitting data blocks during a SDT. The method 400 may be used to perform the transmission operation represented by block 350 in FIG. 3. When the SDT begins (410), the wireless device 40 checks before each data block is transmitted whether it has received its assigned USF value in an expected downlink (DL) radio resource from the wireless access node 20 (block 420) in the expected downlink radio block (i.e., expected according to the offset parameter and the transmission periodicity parameter). As previously noted, the wireless access node 20 transmits a USF value assigned to the wireless device 40 in a downlink radio block associated with the assigned uplink radio block. The wireless device 40 knows which downlink radio block contains the USF for its assigned uplink radio block. The USF value may be a common USF value shared by multiple wireless devices 40. If the assigned USF value is not received in the expected downlink radio block (block 420), the wireless device 40 aborts the current SDT (430) and returns to the idle state (block 460). If the assigned USF value is received in the expected downlink radio block, the wireless device 40 transmits a data block (block 440). After transmitting the data block, the wireless device 40 determines whether any more data blocks remain in the SDT (block 450). If so, the wireless device 40 waits for the next transmission opportunity. If there are no more data blocks, the wireless device 40 returns to the idle state (block 460).

Figure 5:
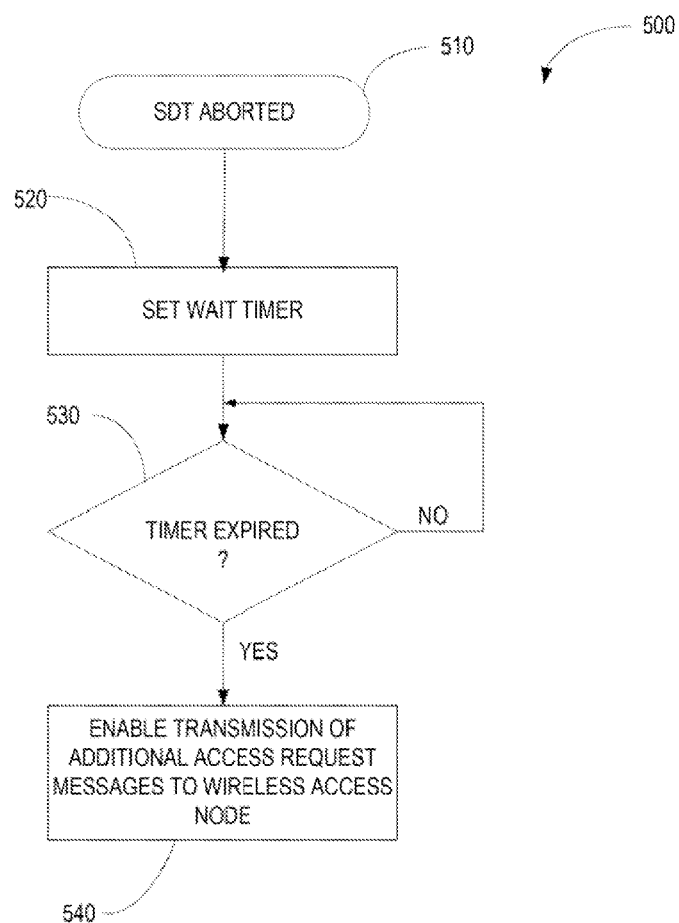
FIG. 5 illustrates a back-off procedure implemented by a wireless device after early termination of a SDT.

In some embodiments, the wireless device 40 may implement a back-off procedure after aborting a SDT. FIG. 5 illustrates an exemplary back-off procedure 500, which may be implemented in a wireless device 40. The back-off procedure 500 is triggered when the SDT is prematurely ended or aborted (510). When the SDT is prematurely aborted, the wireless device 40 sets a wait timer (520). The value of the wait timer may be a random value in a range specified by the wait time parameter in the assignment message. The wireless device 40 then waits until the wait timer expires (530). During the wait period, the wireless device 40 is prohibited from sending an access request on the RACH. When the wait time expires, the wireless device 40 enables transmission of additional access request messages on the RACH (540).

Figure 6:
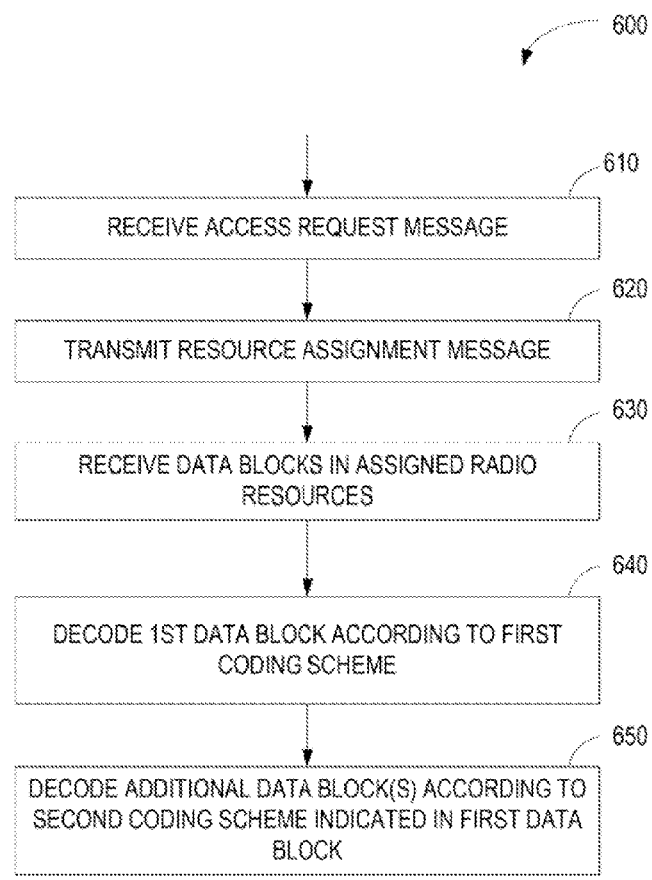
FIG. 6 illustrates a method implemented by a wireless access node for receiving a SDT from a wireless device.

FIG. 6 illustrates an exemplary method 600 implemented by a wireless access node 20 for receiving SDTs from wireless devices 40. The wireless access node 20 receives an access request message from a wireless device 40 (block 610). The access request message includes a first information element indicating that access is needed for a SDT and a second information element indicating the number or amount of radio resources needed for the SDT. In response to the access request, the wireless access node 20 transmits an assignment message to the wireless device 40 (block 620). The assignment message specifies the radio resources assigned for the SDT. In some embodiments, the assignment message may additionally include a coding scheme to be used by the wireless device 40. In response to the assignment message, the wireless access node 20 receives a first data block and one or more additional data blocks on the assigned radio resources from the wireless device 40 (block 630). The first data block is coded according to a first predetermined coding scheme. The additional data blocks, if any, are coded according to a second coding scheme specified in the first data block. The wireless access node 20 decodes the first data block according to the first coding scheme (block 640), and decodes each additional data block according to the second coding scheme (block 650).

Figure 7:
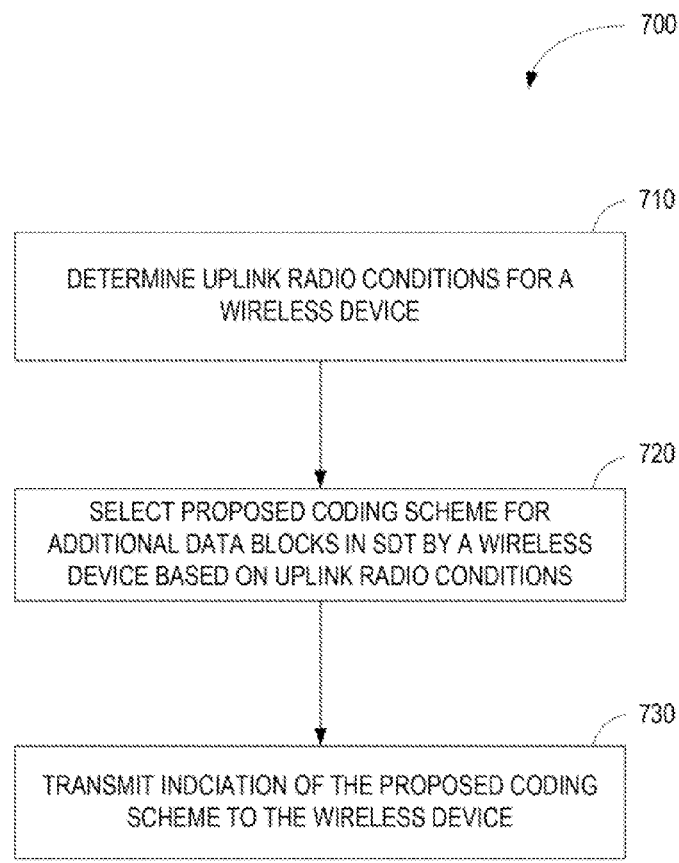
FIG. 7 illustrates a method implemented by a wireless access node of indicating a proposed coding scheme for a SDT.

In some embodiments, the wireless access node 20 may indicate a proposed coding scheme for use by the wireless device 40 for the transmission of data blocks after the first data block. FIG. 7 illustrates an exemplary procedure 700 implemented by a wireless access node for indicating the proposed coding scheme. The wireless access node 20 determines the uplink radio conditions for the wireless device 40 using known techniques based on signals received from the wireless device 40 (block 710). Based on the uplink radio conditions, the wireless access node 20 selects a proposed coding scheme for the additional data blocks in the SDT (block 720). An indication of the proposed coding scheme is then transmitted to the wireless device 40 (block 730). In one embodiment, the indication is included in the proposed coding scheme parameter in the assignment message transmitted from the wireless access node 20 to the wireless device 40.

Figure 8:
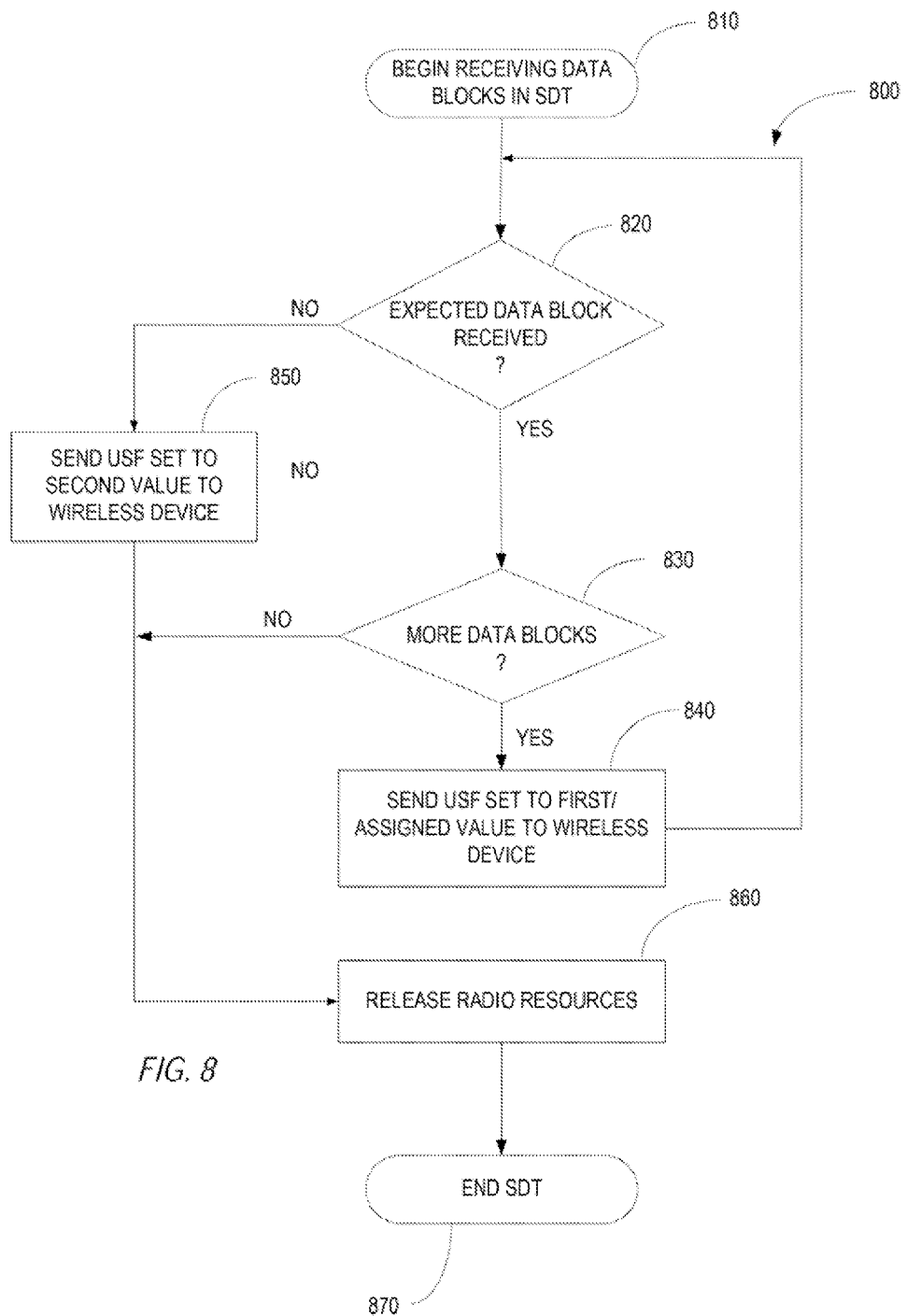
FIG. 8 illustrates a method implemented by a wireless access node for terminating a SDT.

In some embodiments, the wireless access node 20 can prematurely terminate a SDT after receiving one or more data blocks in the SDT. FIG. 8 illustrates an exemplary procedure 800 implemented by a wireless access node 20 for terminating a SDT. The procedure 800 begins when the wireless access node 20 begins receiving data blocks in the SDT from the wireless device 40 (block 810). For each uplink radio block assigned to the wireless device 40, the wireless access node 20 checks whether the expected data block was received (block 820). If so, the wireless access node 20 determines whether more data blocks are expected (block 830). If more data blocks are expected, the wireless access node 20 sends a USF set to a first value assigned to the wireless device before the next scheduled transmission (block 840). If no more data blocks are expected, the wireless access node 20 can release the radio resources assigned to the wireless device 40 (block 860) and the SDT ends (block 870). If an expected data block is not received (block 820), the wireless access node 20 sends a USF set to a second value other than the assigned value to the wireless device 40 before the next scheduled transmission (block 850) to terminate the SDT. In this case, after sending the USF set to the second value, the wireless access node 20 can release the radio resources assigned to the wireless device 40 (block 860) and the SDT ends (block 870).

Figure 9:
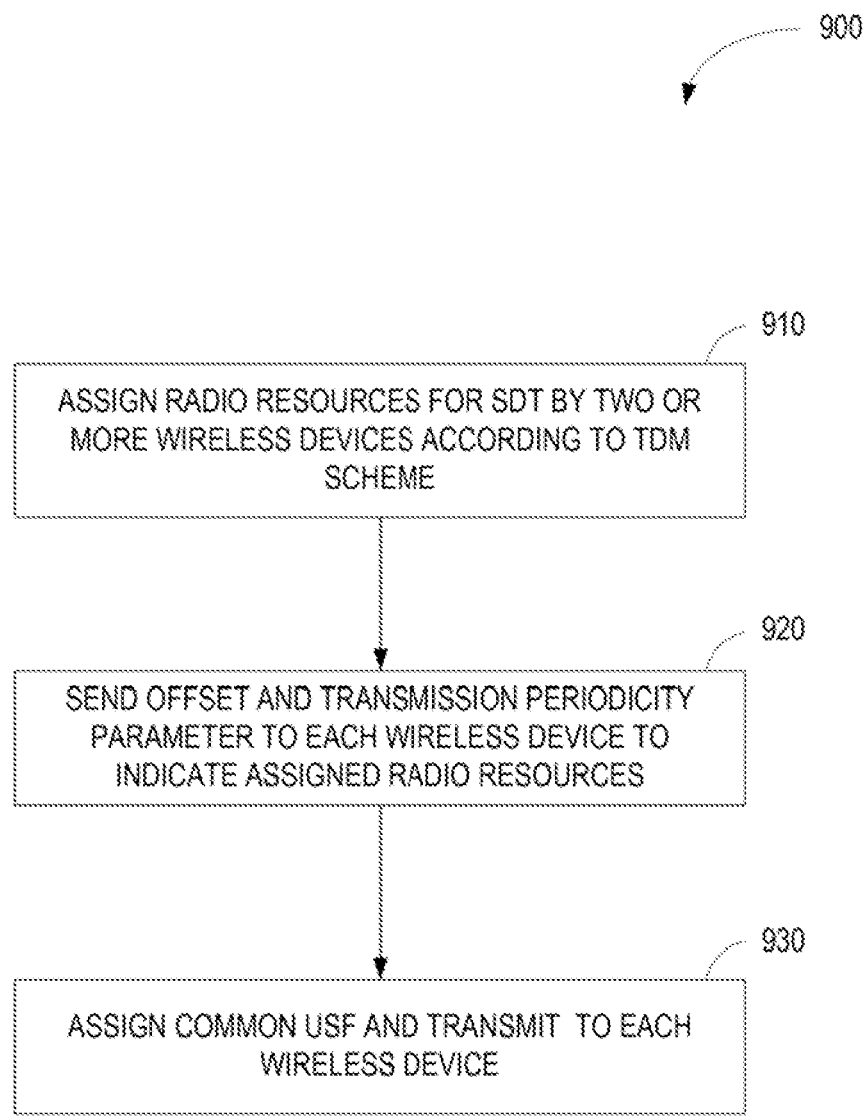
FIG. 9 illustrates a method implemented by a wireless access node for using a common uplink state flag for multiple wireless devices.

In some embodiments, the wireless access node 20 can use a common USF to support SDTs from multiple wireless devices 40. This procedure may be used when the data transmissions from the wireless devices 40 overlap in time. FIG. 9 illustrates an exemplary procedure 900 for using a common USF. The wireless access node 20 assigns radio resources for SDTs by two or more wireless devices 40 (block 910). The wireless access node 20 sends to each wireless device 40 an offset and transmission periodicity parameter to indicate its assigned radio resources (block 920). As previously noted, each wireless device 40 begins its SDT in a different uplink radio block (indicated by the offset) but uses the same transmission periodicity (indicated by the transmission periodicity parameter) so that their transmissions are staggered in time. Because the SDTs from different wireless devices 40 are staggered, the wireless access node 20 can assign a common USF to each of the wireless devices 40 (block 930).

Figure 10:
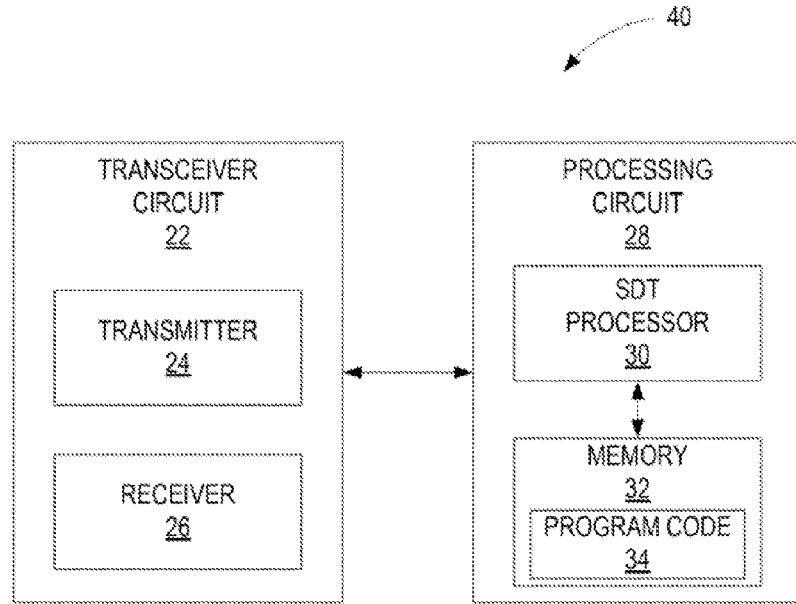
FIG. 10 illustrates an exemplary wireless device configured for SDTs.

FIG. 10 illustrates an exemplary wireless device 40 configured for SDTs as herein described. The wireless device 40 includes a transceiver circuit 22 for communicating with a wireless access node 20 and a processing circuit 28 for processing signals transmitted and received by the transceiver circuit 22 and for controlling operation of the wireless device 40. The transceiver circuit 22 includes transmitter 24 and receiver 26, which may operate according to any standard, e.g., the GSM/EDGE standard. The processing circuit 28 includes a SDT processor 30 and memory 32 for storing program code 34 controlling operation of the wireless device 40. The program code 34 includes code for performing the signaling procedures and processing the SDTs as herein described.

Figure 11:
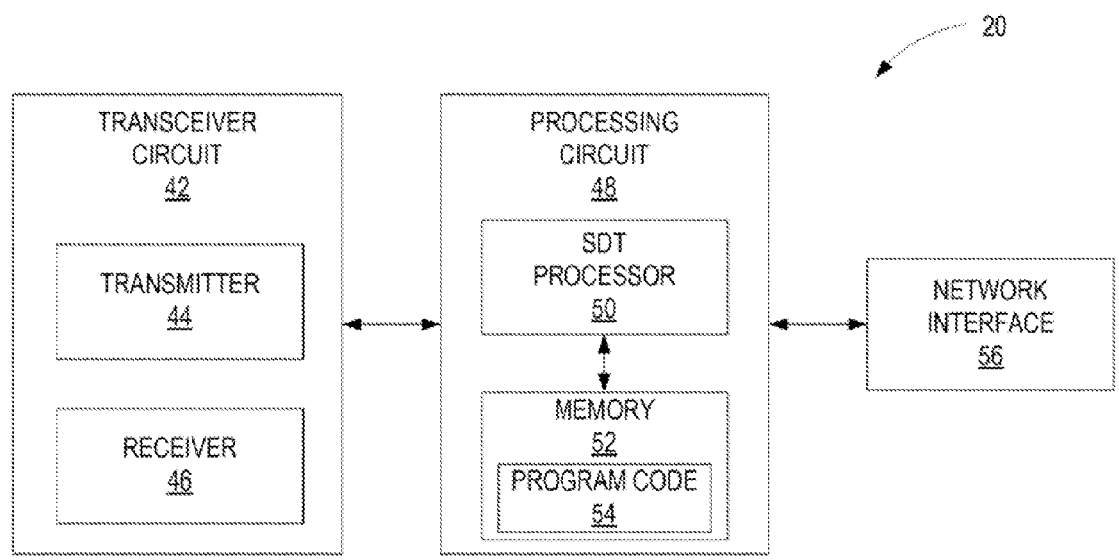
FIG. 11 illustrates an exemplary wireless access node configured to receive SDTs from wireless devices.

FIG. 11 illustrates an exemplary wireless access node 20 configured for SDTs as herein described. The wireless access node 20 includes a transceiver circuit 42 for communicating with wireless devices 40, a processing circuit 48 for processing signals transmitted and received by the transceiver circuit 42 and for controlling operation of the wireless access node 20, and a network interface 56 for communicating with the core network 12. The transceiver circuit 42 includes transmitter 44 and receiver 46, which may operate according to any standard, e.g., the GSM/EDGE standard. The processing circuit 48 includes a SDT processor 50 and memory 52 for storing program code 54 controlling operation of the wireless access node 20. The program code 54 includes code for performing the signaling procedures and processing the SDTs as herein described.

Of course, the present invention may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive, and all changes coming within the meaning and equivalency range of the appended claims are intended to be embraced therein.

What is claimed is:

1. A method implemented in a wireless device for transmitting data in a wireless communication network, the method comprising:

transmitting an access request message to a wireless access node in the wireless communication network, the access request message including a first information element indicating that the wireless device is requesting radio resources for a small data transmission and a second information element identifying a number of radio resources needed for the small data transmission;

receiving an assignment message from the wireless access node in response to the access request message, wherein the assignment message includes an indication of the radio resources assigned for the small data transmission;

coding a first data block in the small data transmission according to a first predetermined coding scheme, wherein the first data block includes an indication of a second coding scheme for additional data blocks in the small data transmission;

coding one or more additional data blocks in the small data transmission according to the second coding scheme specified in the first data block; and transmitting the first data block and the one or more additional data blocks on the radio resources indicated by the assignment message.

2. The method of claim 1, wherein the access request message comprises a Packet Channel Request message transmitted on a Random Access Channel (RACH) for an Enhanced General Packet Radio Service (EGPRS) wireless network.

3. The method of claim 2, wherein the first information element comprises a small data transmission specific establishment cause information element of the Packet Channel Request message.

4. The method of claim 1, wherein the assignment message indicates a proposed coding scheme, and wherein the first one of the transmitted data blocks indicates that the remaining ones of the transmitted data blocks are to be transmitted according to the proposed coding scheme and further indicates a number of additional radio resources that are needed to complete the small data transmission according to the proposed coding scheme.

5. The method of claim 1, wherein the assignment message identifies a first radio resource to be used for the first data block in the small data transmission.

6. The method of claim 5, wherein the assignment message identifies the first radio resource by indicating an offset, relative to a downlink radio resource in which the assignment message is received.

7. The method of claim 5, wherein the assignment message further includes a transmission periodicity parameter indicating radio resource spacing between successive ones of the assigned radio resources.

8. The method of claim 5, wherein the assignment message further includes an uplink state flag, the method further comprising:

monitoring a downlink radio resource during which reception of the uplink state flag set to a first value is expected; and aborting the small data transmission in response to receiving the uplink state flag set to a second value, different from the first value, in the monitored downlink radio resource.

9. The method of claim 8, wherein the assignment message further includes a wait time parameter, the method further comprising, in response to aborting the small data transmission:

setting a timer using a timer value based on the received wait time parameter; and enabling transmission of additional access request messages to the wireless access node upon expiration of the timer.

10. A method in a wireless access node for receiving data from a first wireless device, the method comprising:

receiving an access request message from the first wireless device, the access request message including a first information element indicating that the first wireless device is requesting radio resources for a small data transmission and a second information element identifying a number of radio resources needed for the small data transmission;

transmitting an assignment message to the first wireless device in response to the access request message, wherein the assignment message includes an indication of the radio resources assigned for the small data transmission;

receiving a first data block and one or more additional data blocks on the assigned radio resources, wherein the first data block is coded in accordance with a first predetermined coding scheme and wherein the one or more additional data blocks are coded in accordance with a second coding scheme indicated in the first data block;

decoding the first data block in accordance with the first coding scheme; and decoding the one or more additional data blocks in accordance with the second coding scheme.

11. The method of claim 10, wherein the access request message comprises a Packet Channel Request message transmitted on a Random Access Channel (RACH) for an Enhanced General Packet Radio Service (EGPRS) wireless network.

12. The method of claim 11, wherein the first information element comprises a small data transmission specific establishment cause information element of the Packet Channel Request message.

13. The method of claim 10, further comprising selecting one of a plurality of possible coding schemes based on an estimate of uplink radio conditions, wherein the assignment message identifies the selected possible coding scheme.

14. The method of claim 13, wherein the first one of the transmitted data blocks further indicates a number of additional radio resources that are needed to complete the small data transmission according to the coding scheme selected by the first wireless device, the method further comprising receiving data blocks associated with the small data transmission on the additional radio resources.

15. The method of claim 10, wherein the assignment message identifies a first radio resource to be used for the small data transmission.

16. The method of claim 15, wherein the assignment message identifies the first radio resource by indicating an offset relative to a downlink radio resource in which the assignment message is transmitted.

17. The method of claim 15, wherein the assignment message further includes a transmission periodicity parameter indicating radio resource spacing between successive ones of the assigned radio resources.

18. The method of claim 15, wherein the assignment message further includes an uplink state flag, the method further comprising:

sending the uplink state flag set to a first value responsive to detecting reception of a data block on a radio resource assigned to the first wireless device;

aborting the small data transmission responsive to detecting a failure to receive a data block on a radio resource assigned to the first wireless device; and responsive to said aborting, sending the uplink state flag set to a second value, different from the first value, on one or more subsequent downlink radio resources scheduled for monitoring by the first wireless device.

19. The method of claim 18, further comprising releasing the radio resources assigned to the first wireless device responsive to the transmission of the uplink state flag set to the second value.

20. The method of claim 10, further comprising:
assigning radio resources for small data transmissions by two or more wireless devices, including the first wireless device, according to a time-division multiplexing scheme;
sending an offset and a transmission periodicity parameter to the two or more wireless devices to indicate assigned radio resources; and
assigning a common uplink state flag to the two or more wireless devices, and transmitting the common uplink state flag to the two or more wireless devices.

21. A wireless device for use in a wireless communication network, the wireless device comprising a radio transceiver and a processing circuit configured to:
transmit an access request message to a wireless access node in the wireless communication network, the access request message including a first information element indicating that the wireless device is requesting radio resources for a small data transmission and a second information element identifying a number of radio resources needed for the small data transmission;
receive an assignment message from the wireless access node in response to the access request message, wherein the assignment message includes an indication of the radio resources assigned for the small data transmission;
code a first data block in the small data transmission according to a first predetermined coding scheme, wherein the first data block includes an indication of a second coding scheme for additional data blocks in the small data transmission;
code one or more additional data blocks in the small data transmission according to the second coding scheme specified in the first data block; and
transmit the first data block and the one or more additional data blocks on the radio resources indicated by the assignment message.

22. The wireless device of claim 21, wherein the access request message comprises a Packet Channel Request message transmitted on a Random Access Channel (RACH) for an Enhanced General Packet Radio Service (EGPRS) wireless network.

23. The wireless device of claim 22, wherein the first information element comprises a small data transmission specific establishment cause information element of the Packet Channel Request message.

24. The wireless device of claim 21, wherein the assignment message indicates a proposed coding scheme, and wherein the first one of the transmitted data blocks indicates that the remaining ones of the transmitted data blocks are to be transmitted according to the proposed coding scheme and further indicates a number of additional radio resources that are needed to complete the small data transmission according to the proposed coding scheme.

25. The wireless device of claim 21, wherein the assignment message identifies a first radio resource to be used for the first data block in the small data transmission.

26. The wireless device of claim 25, wherein the assignment message identifies the first radio resource by indicating an offset, relative to a downlink radio resource in which the assignment message is received.

27. The wireless device of claim 25, wherein the assignment message further includes a transmission periodicity parameter indicating radio resource spacing between successive ones of the assigned radio resources.

28. The wireless device of claim 25, wherein the assignment message further includes an uplink state flag, the processing circuit further configured to:
monitor a downlink radio resource during which reception of the uplink state flag set to a first value is expected; and
abort the small data transmission in response to receiving the uplink state flag set to a second value, different from the first value, in the monitored downlink radio resource.

29. The wireless device of claim 28, wherein the assignment message further includes a wait time parameter, the processing circuit further configured to, in response to aborting the small data transmission:
set a timer using a timer value based on the received wait time parameter; and
enable transmission of additional access request messages to the wireless access node upon expiration of the timer.

30. A wireless access node in a wireless communication network, the wireless network node comprising a radio transceiver and one or more processing circuits configured to:
receive an access request message from a first wireless device, the access request message including a first information element indicating that the first wireless device is requesting radio resources for a small data transmission and a second information element identifying a number of radio resources needed for the small data transmission;
transmit an assignment message to the first wireless device in response to the access request message, wherein the assignment message includes an indication of the radio resources assigned for the small data transmission;
receive a first data block and one or more additional data blocks on the assigned radio resources, wherein the first data block is coded in accordance with a first predetermined coding scheme and wherein the one or more additional data blocks are coded in accordance with a second coding scheme indicated in the first data block;
decode the first data block in accordance with the first coding scheme; and
decode the one or more additional data blocks in accordance with the second coding scheme.

31. The wireless access node of claim 30, wherein the access request message comprises a Packet Channel Request message transmitted on a Random Access Channel (RACH) for an Enhanced General Packet Radio Service (EGPRS) wireless network.

32. The wireless access node of claim 31, wherein the first information element comprises a small data transmission specific establishment cause information element of the Packet Channel Request message.

33. The wireless access node of claim 30, wherein the one or more processing circuits is further configured to select one of a plurality of possible coding schemes based on an estimate of uplink radio conditions, wherein the assignment message identifies the selected possible coding scheme.

34. The wireless access node of claim 33, wherein the first one of the transmitted data blocks further indicates a number of additional radio resources that are needed to complete the small data transmission according to the coding scheme selected by the first wireless device, and wherein the radio transceiver is further configured to receive data blocks associated with the small data transmission on the additional radio resources.

35. The wireless access node of claim 30, wherein the assignment message identifies a first radio resource to be used for the small data transmission.

36. The wireless access node of claim 35, wherein the one or more processing circuits is configured to identify the first radio resource by indicating in the assignment message an offset relative to a downlink radio resource in which the assignment message is transmitted.

37. The wireless access node of claim 35, wherein the one or more processing circuits is configured to identify additional radio resources by including in the assignment message a transmission periodicity parameter indicating radio resource spacing between successive ones of the assigned additional radio resources.

38. The wireless access node of claim 35, wherein the assignment message further includes an uplink state flag, and wherein the radio transceiver and one or more processing circuits are further configured to:
- send the uplink state flag set to a first value responsive to detecting reception of a data block on a radio resource assigned to the first wireless device;
- abort the small data transmission in response to detecting a failure to receive a data block on a radio resource assigned to the first wireless device; and,
- responsive to said aborting, send the uplink state flag set to a second value, different from the first value, on one or more subsequent downlink radio resources scheduled for monitoring by the first wireless device.

39. The wireless access node of claim 38, wherein the one or more processing circuits is further configured to release the radio resources assigned to the first wireless device responsive to the transmission of the uplink state flag set to the second value.

40. The wireless access node of claim 30, wherein the radio transceiver and one or more processing circuits are configured to:
- assign radio resources for small data transmissions by two or more wireless devices including the first wireless device according to a time-division multiplexing scheme;
- send an offset and a transmission periodicity parameter to the two or more wireless devices to indicate assigned radio resources; and
- assign a common uplink state flag to the two or more wireless devices, and transmit the common uplink state flag to the two or more wireless devices.

* * * * *